3,624,907
DEVICES FOR THE RATIONAL WASHING OF TOOTH ROOT CANALS WITH SIMULTANEOUS SUCTION OF THE OUTFLOWING LIQUID AND RELATED IMPROVED DEVICES
Michele Brass and Ennio Brass, both of Via Paris Bordone 11, Milan, Italy
Filed June 5, 1969, Ser. No. 830,694
Claims priority, application Italy, June 6, 1968, 17,416/68
Int. Cl. A61c 3/00
U.S. Cl. 32—40                                      9 Claims

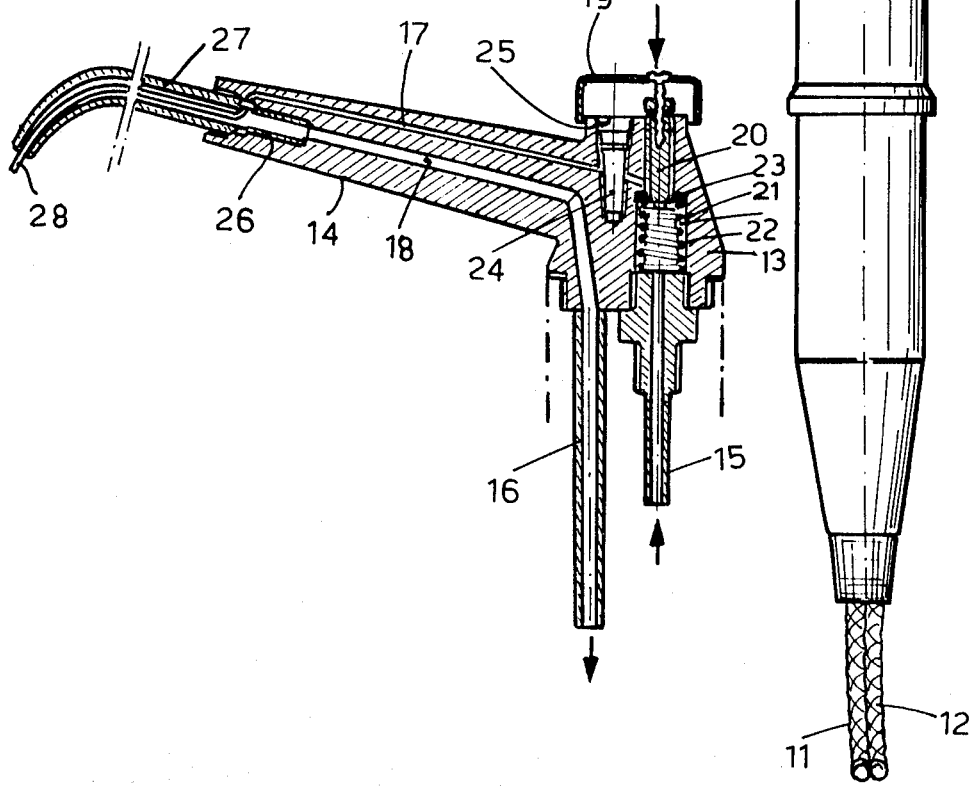

ABSTRACT OF THE DISCLOSURE

This invention relates to an improvement in devices used in treatment of teeth, particularly in work on root canals. The device serves to supply a stream of fluid for the purpose of washing out the root canal or treating it with a medicament and also is connected to a vacuum sorce so that the fluid can be removed as rapidly as it is supplied. The head of the device, consisting of one tube with clearance inside another is sturdy, but yet is small enough in cross-section for insertion directly into the root canal.

BACKGROUND OF THE INVENTION

It is well known that the apparatuses used thus far by the dentists for the washing of the tooth root canals with the simultaneous suction of the outflowing liquid, are constituted of a bulb on the upper part of which there are applied two needles one of which serves to inject the washing liquid and the other one to suck the outflowing liquid: the device is connected to the air syringe of the dental assembly through a suitable handle which serves as handgrip and on which there is arranged the driving organ. The device, which still ensures fairly good results, shows some considerable inconveniences, first among them being that of involving rather large overall dimensions and a high cost in relation to its complex and delicate assembly and a second inconvenience due to the fact that, by using two needles coupled with each other both needle points should be necessarily introduced into the tooth root canal, in order to create therein the circulation of the curative liquid, whilst the canal opening does not always allow it, developing flections and displacements of the thin tubulars which are very brittle and subject therefore to easy breakages.

SUMMARY OF THE INVENTION

It is the specific object of this invention to provide an improvement in the devices of the indicated type and for the applications stated or equivalent ones, and such as to make the device itself of more practical use in relation to the decreased overall dimensions characterizing it with consequent appreciable reduction in its making cost.

Complementarily, the improvement according to this invention is directed toward permitting a larger use of the device, inasmuch as instead of showing two parallel needles for the creation of the liquid circulation, it uses one needle only, which may be more easily introduced also into cavities of reduced dimensions. It is also a complementary object of this invention to provide improved devices, wherein the operating needle may be easily and quickly interchanged, in that it is removably applied to the assembly.

Such advantageous industrial results are obtained according to the present invention substantially in that the improvement of this invention eliminates the traditional bulb by using as flow starting point and outflowing liquid arrival point the same handle to which there are connected the related ducts or passages proceeding from the air compressor of the dental assembly to which the device is fitted: on the head of the handle there are provided a delivery flow opening push-button and an organ serving for the regulation of the flow pressure, whereas both related ducts or passages extend into a lip of determined length and integral with the handle at the end of which there is removably engaged a curved tube internally to which there is coaxially housed a thin needle, connected to the delivery duct or passage, the tube being connected to the suction duct or passage.

These and further more specific application features of the improvement according to this invention, together with one of the technical solutions which is considered to be particularly advantageous for the practical performance of the invention, will be better understood from the following detailed description of a possible embodiment form thereof, taken in conjunction with the accompanying drawings.

The views of the drawings:

FIG. 1 shows the improved device in a side view, with the dissociated needle;

FIG. 2 represents the same improved device as above, viewed in axial section, with the needle in connected condition.

DETAILED DESCRIPTION OF THE PREFERRED EMBODIMENT

The device according to the present invention comprises in its whole a handle 10, being in principle of cylindrical shape and tapering in the lower part from which come out the two flexible ducts or hoses 11 and 12 to the upper part of which there is screwed the head 13 from which the beak 14 departs with a certain angulation related to its axis: with the lower part of the head 13 there are integral the delivery duct or passage 15 and the suction duct or passage 16, which extend up to the end of the beak 14 via the respective small canals or passages 17 and 18. On the upper part of the head 13 there is slidably keyed the cap 19 with which there is made intgeral a small piston 20, axially sliding at the chamber 21, coaxial with the delivery duct or passage 15, between this and the small piston being placed the elastic means 22, pushing it into closing of the small canal or passage 17 by means of suitable seal 23: transversally of the cited small canal or passage 17 there is also provided a conical pin 24, axially sliding in a corresponding equally shaped chamber in which it is pushed in a smaller or larger measure via its threaded head 25 which may be screw-connected, so as to ensure the regulation of the delivery flow and therefore of its pressure. At the end of the beak 14, the small canal or passage 18 widens, showing peripherally a double packing 26, provided with a central circular channel whereat there is the exit of the canal or passage 17: a curved tube 27, provided with a corresponding lowered section, pressure-engages in the chamber via the packing and coaxially theretothere is housed a thin needle 28 which, through a radial hole provided in said tube, puts into communication with the small canal or passage 17 through the central collar of the packing, which thus acts as connecting chamber.

The operation of the improved device is the following: the liquid, used for the washing of the tooth root canals and proceeding from the pressing device of well known type, enters through the flexible duct or passage 12 the stationary duct or passage 15, integral with the head 13, reaching by prior regulation of the pin 24, relieving its pressure, the canal or passage 17 as a result of the push exerted by on the cap 19, which displaces, in antagonism to the elastic means 22, the packing which closes the chamber 21 and penetrating the needle 28; inasmuch as, still by the well known means, there is created a vacuum in the ducts or passages 16 and 11, the liquid is sucked and caused to outflow via the tube 27 and the canal or passage 18 to the discharge point. The device improved according to this invention has been described and represented by way of example, but not in a limiting sense, and for showing its main features: it is understood that, without departing from the scope of the invention several changes and modifications and further improvements may be introduced, all depending on several requirements and conveniences of production and application, as it is understood that to the realm of the industrial protection applied for should appertain any equivalent application of the improvement according to this invention, and however any device improved according to one or more of any of the appended claims.

We claim:

1. A device for cleaning the root canal of teeth with simultaneous removal of fluid by suction comprising elongated means formed with a first passage therethrough, said first passage having a first end and a second end; a thin hollow needle located with clearance in said first passage in the region of said first end thereof; a second passage in said elongated means and having a first end and a second end and communicating at said first end with the interior of said hollow needle; means for connecting said second end of said first passage to a source of vacuum; means for connecting said second end of said second passage to a source of fluid under pressure; and means cooperating with said second passage for regulating the flow of said fluid therethrough.

2. A device as defined in claim 1, wherein said elongated member comprises a first arcuate part housing said needle and a second part, said first part being removably connected at one end thereof to said second part, and a packing providing a fluid-tight joint between the two parts, said first passage extending through both parts and said second passage ending in said second part in the region of said packing.

3. A device as defined in claim 2, wherein the point of said hollow needle projects beyond the other end of said first part of said elongated means.

4. A device as defined in claim 2, wherein said packing has a circular channel provided in its median portion, and wherein said first end of said second passage terminates at said circular channel and said hollow needle terminates in a region of said removable portion corresponding to the location of the circular channel and is connected to said second passage through said circular channel.

5. A device as defined in claim 1, wherein said regulating means comprises a first valve means for control of the flow of said fluid under pressure as to starting, flow rate and stopping.

6. A device as defined in claim 5, wherein said elongated member is fitted exteriorly with actuator means controlling said first valve means.

7. A device as defined in claim 1, wherein a second valve means in said second passage is provided for setting the maximum flow rate through said second passage when said first valve is completely open.

8. A device as defined in claim 1, wherein said elongated means is removably connected to a housing which covers said second ends of said passages leading to said sources of pressurized fluid and of vacuum.

9. A device as defined in claim 8, wherein said elongate means projects at an angle from said housing.

References Cited
UNITED STATES PATENTS

| | | | |
|---|---|---|---|
| 1,189,735 | 7/1916 | Quintin | 32—40 |
| 3,035,351 | 5/1962 | Hirsch | 32—40 |
| 3,499,393 | 3/1970 | Bent | 32—40 |

ROBERT PESHOCK, Primary Examiner